United States Patent [19]
Hashizume et al.

[11] Patent Number: 5,905,193
[45] Date of Patent: May 18, 1999

[54] PREIGNITION DETECTION APPARATUS

[75] Inventors: Katsushi Hashizume; Kazuhisa Mogi, both of Susono, Japan

[73] Assignee: Toyota Jidosha Kabushiki Kaisha, Aichi-ken, Japan

[21] Appl. No.: 08/888,337

[22] Filed: Jul. 2, 1997

[30] Foreign Application Priority Data

Jul. 15, 1996 [JP] Japan ................................. 8-184994

[51] Int. Cl.⁶ ............................................... G01M 15/00
[52] U.S. Cl. ............................................ 73/35.09; 701/111
[58] Field of Search .............................. 73/35.09, 35.11, 73/116, 117.3, 118.1; 123/425; 701/111

[56] References Cited

U.S. PATENT DOCUMENTS

| | | |
|---|---|---|
| 4,409,937 | 10/1983 | Asano . |
| 4,584,869 | 4/1986 | Frodsham ................................ 73/35.09 |
| 5,190,011 | 3/1993 | Hashimoto et al. .................... 123/425 |
| 5,204,630 | 4/1993 | Seitz et al. . |
| 5,235,953 | 8/1993 | Kato et al. ............................. 123/425 |
| 5,355,853 | 10/1994 | Yamada et al. ........................ 123/425 |
| 5,419,180 | 5/1995 | Yamada et al. ........................ 73/35.09 |
| 5,535,722 | 7/1996 | Graessley et al. ..................... 123/425 |
| 5,598,822 | 2/1997 | Fujishita et al. ....................... 123/425 |
| 5,608,633 | 3/1997 | Okada et al. ........................... 73/35.09 |
| 5,632,247 | 5/1997 | Hashizume et al. ................... 123/425 |
| 8,620,123 | 3/1996 | Hashizume et al. . |

FOREIGN PATENT DOCUMENTS

| | | |
|---|---|---|
| 443708 | 8/1991 | European Pat. Off. . |
| 1-88042 U | 6/1989 | Japan . |

*Primary Examiner*—George Dombroske
*Assistant Examiner*—Eric S. McCall
*Attorney, Agent, or Firm*—Kenyon & Kenyon

[57] ABSTRACT

The invention provides a preignition detection device that is capable of detecting a preignition condition (PI) in an incipient stage. Engine vibration is detected by a vibration sensor 113 and read into a controller 12. When the length of a period during which abnormal vibration of a magnitude greater than a predetermined level occurs in succession has exceeded a predetermined length of period, or when the frequency of occurrence of abnormal vibration during a predetermined period is greater than a predetermined value and the cumulative sum of the frequencies of occurrence of abnormal vibration has exceeded a predetermined value, then it is determined that preignition has occurred. Here, a determination value, based on which the occurrence of preignition is determined, can be varied to prevent erroneous decisions and to improve responsiveness.

20 Claims, 7 Drawing Sheets

ABNORMAL VIBRATION

NON-ABNORMAL-VIBRATION INTERVAL COUNTER

NON-ABNORMAL-VIBRATION PERIOD

FREQUENT VIBRATION INTERVAL COUNTER

PREIGNITION DETERMINATION VALUE

ADVANCE
↑
↓
RETARD $t_0$ $t_1$   $t_2$ $t_3$   $t_4$   $t_5 t_6$   $t_7$ $t_8$   $t_9$ $t_{10}$   $t_{11} t_{12}$

ABNORMAL VIBRATION OCCURRENCE COUNT

NKC-KZ
N2

ABNORMAL VIBRATION ACCUMULATED VALUE

IGNITION TIMING $t_0$  $t_1$  $t_2$  $t_3$ $t_4$ /$t_6$
                          $t_5$  $t_7$

PREIGNITION DETECTION APPARATUS

BACKGROUND OF THE INVENTION

1. Field of the Invention

The present invention relates to a preignition detection apparatus for an internal combustion engine, and more particularly to a preignition detection apparatus capable of detecting a preignition condition in an incipient stage.

2. Prior Art

Preignition is defined as the phenomenon that an air-fuel mixture is spontaneously ignited during the compression stroke by residual heat contained in deposits which adhere to the ignition plug and/or an inner wall of an engine cylinder.

Preignition causes not only a sharp decrease of the output of an engine and/or a fluctuation of engine speed, but can also damage the engine, at the worst.

To solve this problem, there has already been proposed an internal combustion engine control device which determines that preignition has occurred when abnormal engine vibration, a magnitude thereof being greater than a predetermined level, is detected before ignition, and cuts off fuel to the cylinder (See Japanese Utility Model Publication No. 1-88052).

The above-mentioned engine control device, however, cannot prevent the engine being damaged, because it determines that preignition has occurred when abnormal engine vibration, the magnitude thereof being greater than a predetermined level, is detected and cannot determine that preignition has occurred until after preignition has become significantly serious.

SUMMARY OF THE INVENTION

In view of the above problem, it is an object of the present invention to provide a preignition detection apparatus capable of detecting a preignition condition in an incipient stage.

A preignition detecting apparatus according to a first aspect comprises: a vibration detecting means for detecting vibration of an internal combustion engine; an abnormal vibration occurrence interval measuring means for measuring a time interval while abnormal vibration higher than a predetermined level is being detected by said vibration detecting means; a frequent vibration continuing interval measuring means for measuring a time interval while the abnormal vibration occurrence interval measured by said abnormal vibration occurrence interval measuring means is shorter than a predetermined non-abnormal vibration continuing interval; and a preignition determining means for determining that preignition has occurred when the frequent vibration continuing internal measured by said frequent vibration continuing internal measuring means becomes longer than a predetermined preignition determining interval.

According to this preignition detecting apparatus, it is determined that preignition has occurred when a frequent vibration continuing interval becomes longer than a predetermined interval.

A preignition detecting apparatus according to a second aspect comprises: a vibration detecting means for detecting vibration of an internal combustion engine; an abnormal vibration occurrence frequency calculating means for calculating a frequency in detecting of abnormal vibration higher than a predetermined level by said vibration detecting means; an accumulating means for accumulating the frequency calculated by said abnormal vibration occurrence frequency calculating means; and a preignition determining means for determining that preignition has occurred when the accumulated frequency becomes larger than a predetermined preignition determining value.

According to this preignition detecting apparatus, it is determined that preignition has occurred when an accumulated frequency becomes larger than a predetermined value.

DETAILED DESCRIPTION OF THE PREFERRED EMBODIMENTS

Figure 1:
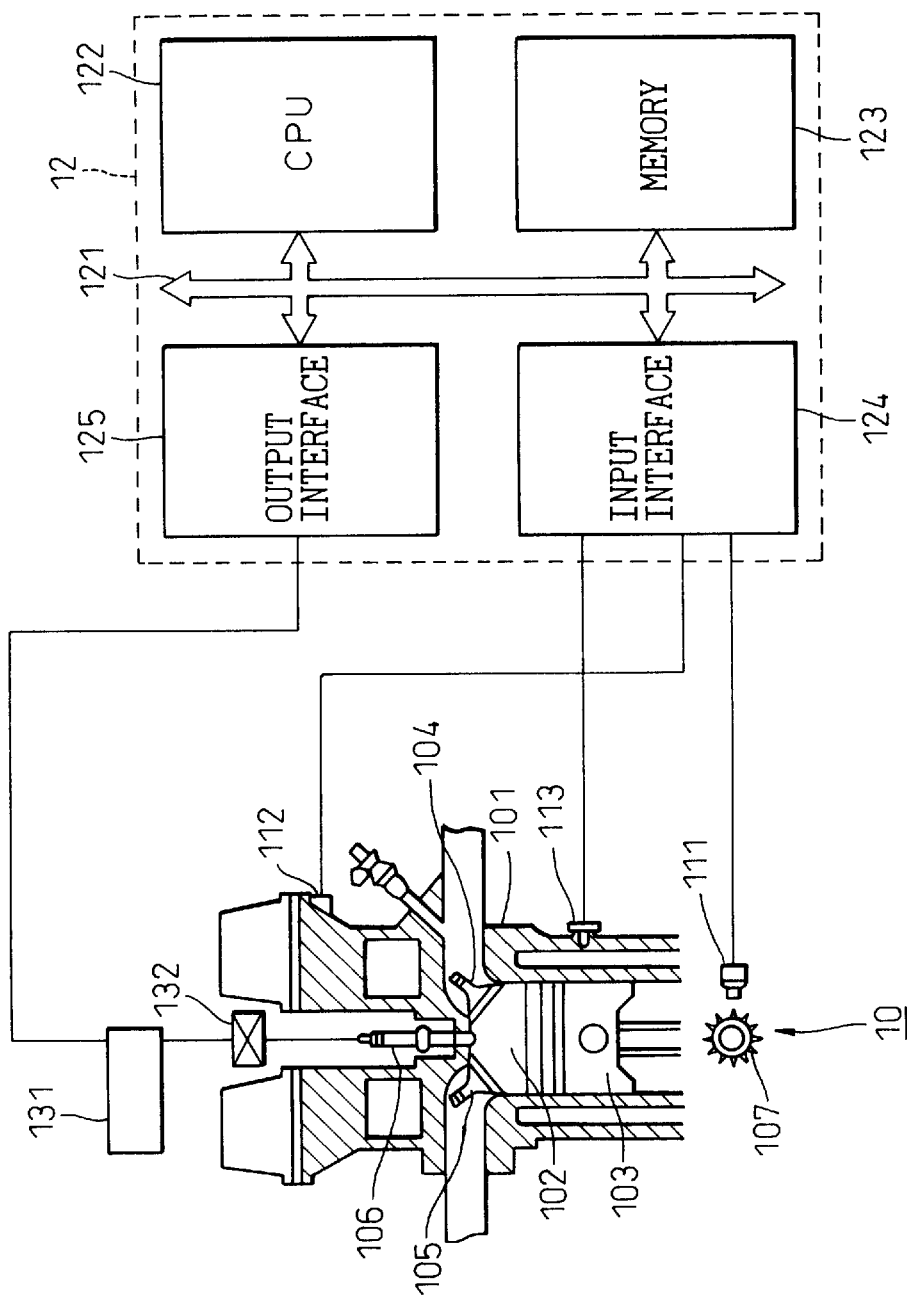
FIG. 1 is a diagram showing the configuration of a preignition detection apparatus according to the present invention.

FIG. 1 is a diagram showing the configuration of a preignition detection apparatus according to the present invention. An internal combustion engine 10 has a piston 103 which moves up and down in a cylinder 102 bored in a cylinder block 101.

An intake valve 104, an exhaust valve 105, and a spark plug 106 are mounted on the top of the cylinder 102, an air/fuel mixture, drawn through the intake valve 104 and compressed by the upward movement of the piston 103, is ignited by the spark plug 106 and is caused to expand, forcing the piston 103 downward and thus generating power.

The up and down motion of the piston is converted to rotary motion by means of a crankshaft (not shown). A timing rotor 107 is attached to the forward end of the crankshaft.

The timing rotor 107 has a total of 12 teeth formed at intervals of 30°, and as each tooth of the timing rotor 107 passes, a pulse is outputted from a crankshaft position sensor 111 mounted in close proximity to the timing rotor 107. In this way, the crankshaft angle can be detected every 30° by means of the crankshaft position sensor 111.

An intake camshaft (not shown) which drives the intake valve 104 is equipped with a protruding tab, and as the protruding tab passes, a pulse is outputted from a camshaft sensor 112 mounted in close proximity to the intake camshaft. In this way, one revolution of the camshaft, i.e., one cycle of the internal combustion engine, can be detected by means of the camshaft sensor 112.

Further, a vibration sensor 113 is mounted in the cylinder block 101 to detect vibration occurring in the internal combustion engine.

Outputs of the crankshaft position sensor 111, camshaft sensor 112, and vibration sensor 113 are fetched into a controller 12.

The controller 12 is constructed from a microcomputer consisting of a CPU 122, a memory 123, an input interface 124, and an output interface 125, which are interconnected by a data bus 121. The output of each sensor is fetched into the CPU 122 via the input interface 124.

The output interface 125 of the controller 12 outputs an ignition command signal which is supplied to the spark plug 106 via an igniter 131 and an ignition coil 132.

Besides the previously described preignition, knocking also causes engine vibration and knocking occurs when a residual combustible gas in the cylinder 102 self-ignites after sparking of the spark plug 106. When the engine is not operated under a condition where preignition may occur, that is, when the engine is not operated under high-temperature and high-load conditions, preignition does not occur. Accordingly, the detection of preignition is performed in an ignition timing control routine for inhibiting knocking.

Figure 2:
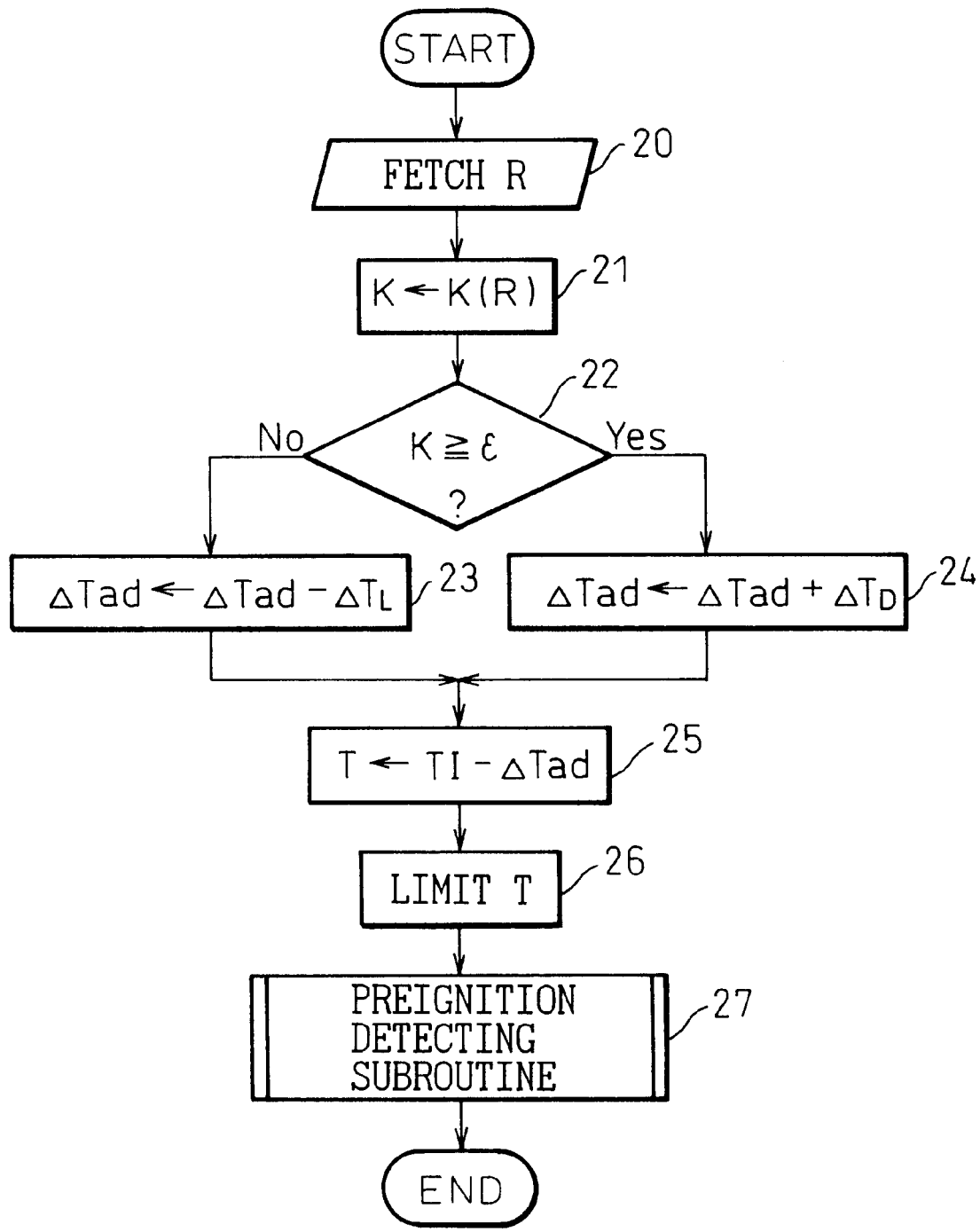
FIG. 2 is a flowchart for an ignition timing control routine.

FIG. 2 is a flowchart of the ignition timing control routine executed in the controller 12. This routine is executed every fixed interval.

At step 20, output R of the vibration sensor 113 mounted in the cylinder block 101 is read, and at step 21, a vibration level K is determined as a function of the output R of the vibration sensor 113.

$$K=K(R)$$

For example, the moving average of the output R of the vibration sensor 113 can be used for determining the vibration level.

At step 22, it is determined whether or not the vibration level K is greater than or equal to a predetermined threshold value E, to determine whether or not the engine is experiencing abnormal vibration.

When the determination at step 22 is negative, that is, when the engine is not experiencing abnormal vibration, an adjustment value $\Delta T_{ad}$ for adjusting a reference ignition timing TI is decreased by a prescribed advancing amount $\Delta T_L$ at step 23 before proceeding to step 25.

$$\Delta T_{ad} \leftarrow \Delta T_{ad} - \Delta T_L$$

Conversely, when the determination at step 22 is affirmative, that is, when the engine is experiencing abnormal vibration, the adjustment value $\Delta T_{ad}$ is increased by a prescribed lagging amount $\Delta T_D$ at step 25 before proceeding to step 25.

$$\Delta T_{ad} \leftarrow \Delta T_{ad} + \Delta T_D$$

At step 25, the adjustment value $\Delta T_{ad}$ is subtracted from the reference ignition timing TI, thereby advancing or retarding the ignition angle to determine the ignition timing T.

$$T \leftarrow TI - \Delta T_{ad}$$

As is known, the reference ignition timing TI is calculated as a function of engine speed Ne and intake air flow rate Qa.

$$TI \leftarrow TI(Ne, Qa)$$

Here, to quickly suppress abnormal engine vibration, the value of the prescribed retardation amount $\Delta T_D$ is made larger than the value of the prescribed advancing amount $\Delta T_L$.

At step 26, the ignition timing T is limited between predetermined most retarded timing $T_D$ and the reference ignition timing TI, and the control proceeds to step 27.

At step 27, a preignition detecting subroutine is executed, and then the routine is terminated.

Figure 3:
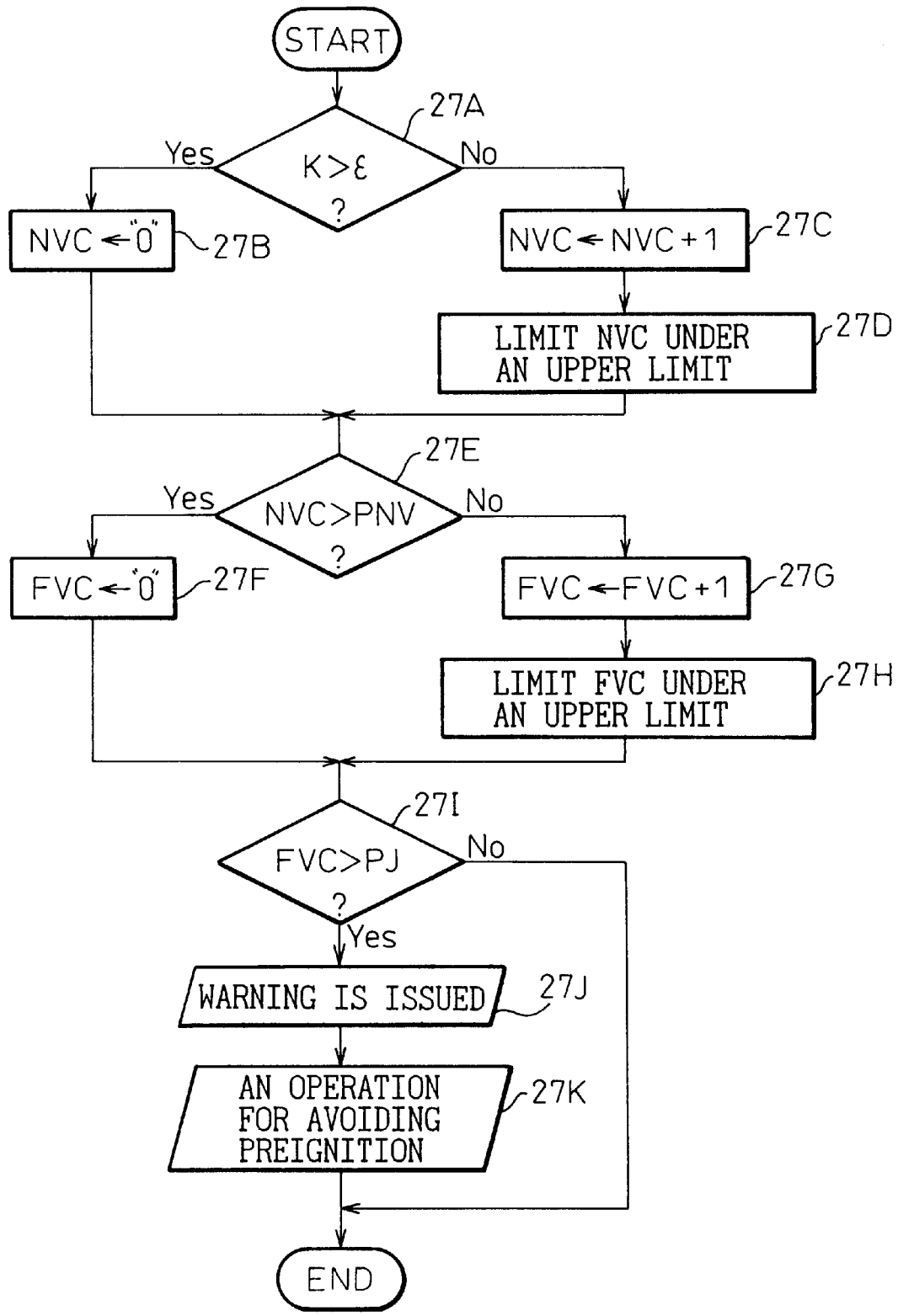
FIG. 3 is a flowchart for a first preignition detecting subroutine.
Figure 4A:
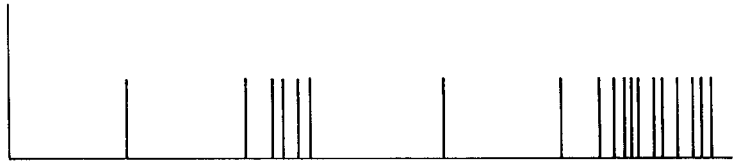
FIG. 4A–4D are diagrams for explaining the operation of the first preignition detecting subroutine.
Figure 4B:
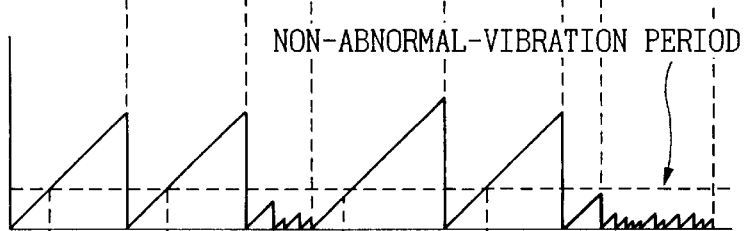
Figure 4C:
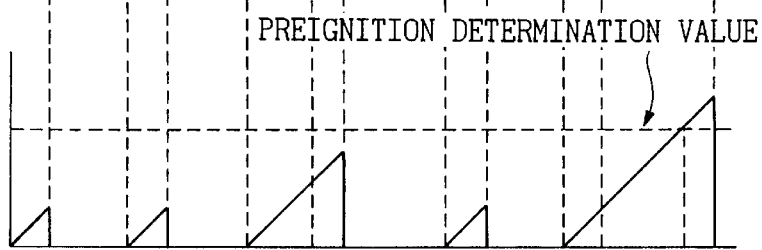
Figure 4D:
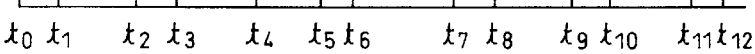

FIG. 3 is a flowchart illustrating the first preignition detecting subroutine executed at step 27. At step 27A, it is determined whether or not the vibration level K is greater than the predetermined threshold value $\epsilon$.

When the determination at step 27A is affirmative, that is, when the engine is experiencing abnormal vibration, a non-abnormal-vibration interval counter NVC, which indicates a period free from abnormal vibration, is reset to "0", before proceeding to step 27E.

When the determination at step 27A is negative, that is, when the engine is not experiencing abnormal vibration, then the non-abnormal vibration interval counter NVC is incremented at step 27C, and limited to less than an upper limit value at step 27D, before proceeding to step 27E.

The reason for limiting the non-abnormal vibration interval counter NVC to less than an upper limit value is as follows.

That is, when abnormal engine vibration occurs frequently, the non-abnormal vibration interval counter NVC is frequently reset, and it does not exceed a predetermined non-abnormal-vibration period PNV.

Conversely, as long as abnormal engine vibration does not occur, the non-abnormal vibration interval counter NVC continues to increase. The non-abnormal-vibration interval counter actually incorporated in the controller 12 is reset to "0" when it reaches a maximum countable value, and then starts to increase again. Accordingly, if abnormal vibration was detected immediately after the non-abnormal vibration interval counter NVC was reset to "0" because abnormal engine vibration did not occur for a long period of time, it may be determined by mistake that abnormal engine vibration has been occurring frequently. To prevent such a faulty determination, it becomes necessary to maintain the non-abnormal-vibration interval counter NVC at the upper limit value when abnormal engine vibration has not occurred for a long period.

At step 27E, it is determined whether or not the count value of the non-abnormal vibration interval counter NVC has exceeded the non-abnormal vibration period PNV.

When the determination at step 27E is affirmative, that is, when abnormal engine vibration has not occurred for a long period, a frequent vibration continuing interval counter FVC, which indicates a period for which the engine is experiencing abnormal vibration at frequent intervals, is reset to "0" at step 27F before proceeding to step 27I.

Conversely, when the determination at step 27E is negative, that Is, when the engine is experiencing abnormal vibration at frequent intervals, the frequent vibration continuing interval counter FVC is incremented at step 27G, and limited to less than an upper limit value in step 27H, before proceeding to step 27I.

The reason for limiting the frequent vibration continuing interval counter FVC to less than an upper limit value is similar to the reason for limiting the non-abnormal vibration interval counter NVC to less than an upper limit value, that is, a faulty determination that the engine is not experiencing abnormal vibration at frequent intervals is prevented from being made when the frequent vibration continuing interval counter FVC is reset after reaching its maximum countable value.

At step 27I, it is determined whether or not the count value of the frequent vibration continuing interval counter FVC is greater than a predetermined preignition determination value PJ.

When the determination at step 27I is affirmative, that is, when the count value of the frequent vibration continuing interval counter FVC is greater than the predetermined preignition determination value PJ, it is determined that preignition has occurred, and a warning is issued at step 27J, an operation for avoiding preignition is executed at step 27K, and then this subroutine is terminated.

Conversely, when the determination at step 27I is negative, that is, when the count value of the frequent vibration continuing interval counter FVC is not greater than the predetermined preignition determination value PJ, it is determined that preignition has not been encountered, and this subroutine is immediately terminated.

FIG. 4A–4D are diagrams for explaining the operation in the first preignition detecting subroutine. Engine vibration, the count value of the non-abnormal-vibration interval counter NVC, the count value of the frequent vibration continuing interval counter FVC, and the ignition timing are shown in this order from the top to the bottom. Time is plotted along the abscissa.

Consider the case in which monitoring is started at time $t_0$ and abnormal vibration is detected at times $t_2$, $t_4$ to $t_5$, $t_7$, $t_9$, and $t_{10}$ to $t_{12}$.

That is, after time $t_0$, the non-abnormal-vibration interval counter NVC and the frequent vibration continuing interval counter FVC are incremented.

Since no abnormal vibration is detected until $t_2$, the count value of the non-abnormal-vibration interval counter NVC exceeds the non-abnormal-vibration duration period PNV, and the frequent vibration continuing interval counter FVC is reset at time $t_1$ so that its count value does not exceed the preignition determination value PJ.

At time $t_2$, abnormal vibration happens and the non-abnormal-vibration interval counter NVC is reset and starts to increment again. The operation from $t_2$ to $t_4$ is the same as that from to $t_0$ $t_2$.

From time $t_4$ to $t_5$, abnormal vibration occurs in succession, so that the non-abnormal-vibration interval counter NVC is reset frequently and the count value of the frequent vibration continuing interval counter FVC continues to increase. Because the abnormal vibration stops after time $t_5$, the non-abnormal-vibration interval counter NVC is reset and starts to increase again. At time $t_6$, the counter goes over the non-abnormal-vibration period PNV, and the frequent vibration continuing interval counter FVC is reset. Accordingly, the frequent vibration continuing interval counter FVC does not exceed the preignition determination value PJ, and it is not determined that preignition has occurred.

Since abnormal vibration also occurs in succession from $t_9$ to $t_{12}$, the non-abnormal-vibration interval counter NVC is reset frequently and the count value of the frequent vibration continuing interval counter FVC continues to increase. The frequent vibration continuing interval counter FVC exceeds the preignition determination value PJ at time $t_{11}$, and here it is determined that preignition has occurred.

From time $t_0$ to $t_{10}$, the air-fuel mixture in the cylinder fires with a certain delay after the ignition of the spark plug 106. The firing timing gradually approaches the ignition timing after time $t_{10}$ and the air-fuel mixture fires before the ignition of the spark plug 106, that is, preignition continuously occurs.

The non-abnormal-vibration period PNV and the preignition determination value PJ are previously fixed values in the above embodiment, but the non-abnormal-vibration period PNV and the preignition determination value PJ may be determined based on the learning values of the non-abnormal-vibration interval counter NVC and frequent vibration continuing interval counter FVC, respectively.

In that case, it becomes possible to compensate for differences in antiknock characteristics of fuel (for example, due to changeover between regular gasoline and high octane gasoline) and variations in abnormal vibration occurrence characteristics due to variations in temperature, humidity, and other environmental conditions.

Furthermore, by making a decision based on the ratios of the present non-abnormal-vibration duration period PNV and preignition determination value PJ to the respective learning values, variations in the detecting characteristics of the vibration sensor 113 can also be compensated.

As described above, according to the first preignition detecting subroutine, preignition can be detected almost at the same time as the preignition actually occurs.

However, when the condition just before preignition may occur is maintained, and abnormal vibration has not been detected for the specified period, the frequent vibration duration interval counter FVC is reset. Therefore, the detection of preignition may be delayed when a condition where abnormal vibration occurs frequently is established, because preignition cannot be detected until abnormal vibration is continuously detected for a specified period after it begins.

Figure 5:
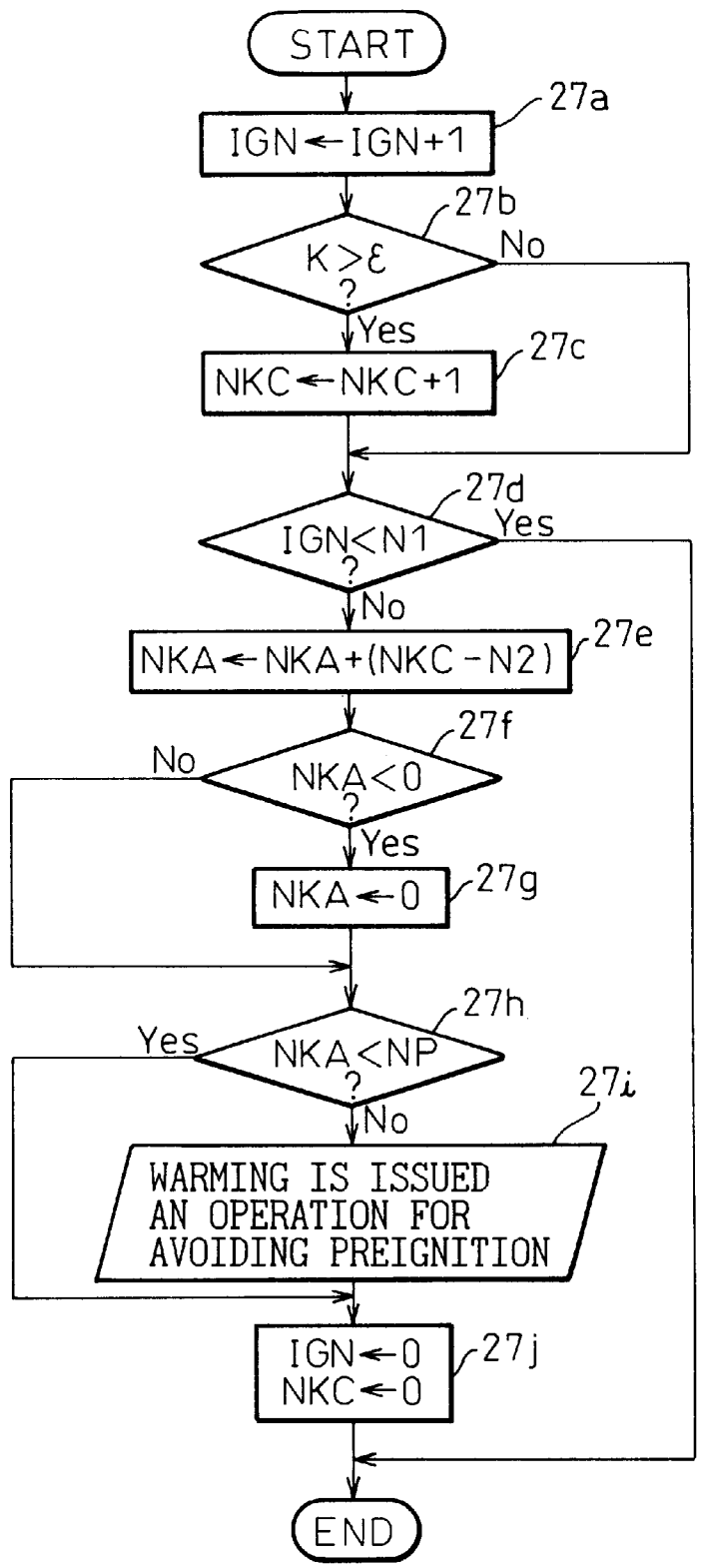
FIG. 5 is a flowchart for a second preignition detecting subroutine.
Figure 6A:
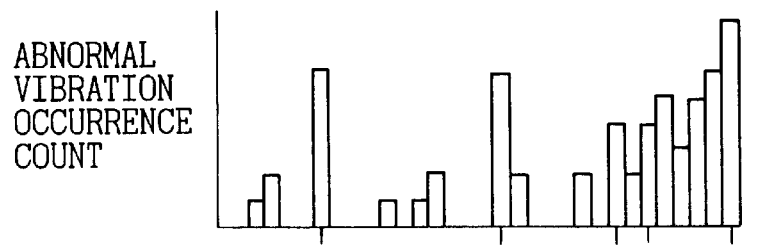
FIG. 6A–6D are is a diagrams for explaining the operation in the second preignition detecting subroutine.
Figure 6B:
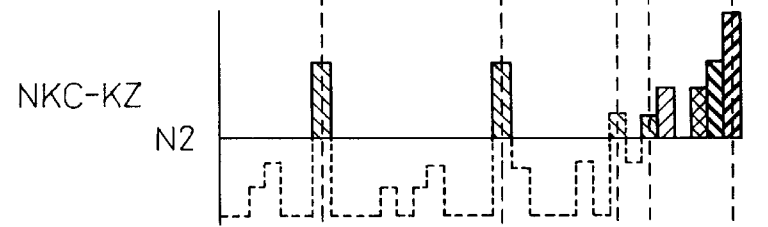
Figure 6C:
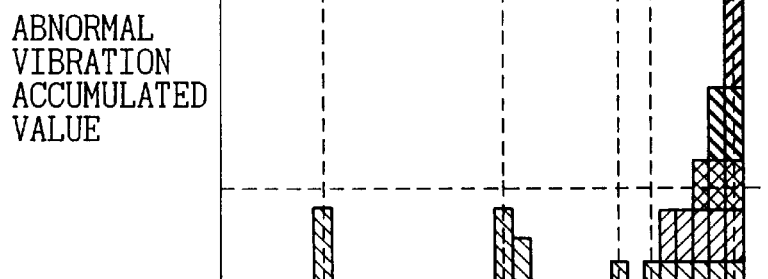
Figure 6D:
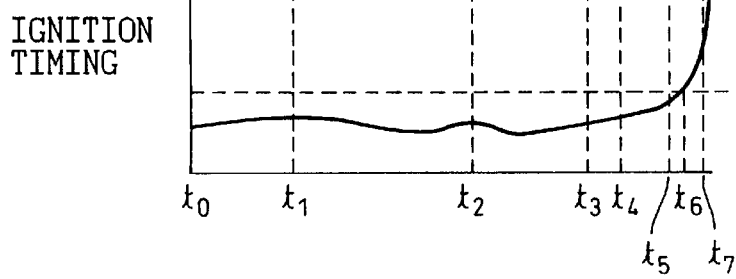

FIG. 5 is a flowchart illustrating a second preignition detecting subroutine which is designed to overcome the above problem, and which is executed in place of the first preignition detecting subroutine at step 27 of the ignition timing control routine.

At step 27a, ignition count counter IGN is incremented, and at step 27b, it is determined whether or not the vibration level K is greater than the predetermined threshold value $\epsilon$.

When the determination at step 276 is affirmative, that is, when the engine is experiencing abnormal vibration, the abnormal vibration occurrence counter NKC is incremented at step 27c before control proceeds to step 27d. When the determination at step 27b is negative, that is, when the engine is not experiencing abnormal vibration, the control proceeds directly to step 27d.

At step 27d, it is determined whether or not the ignition count counter IGN is less than a predetermined ignition count N1. When the determination at step 27d is affirmative, that is, when the ignition count is less than the predetermined ignition count, this subroutine is immediately terminated.

Note, if the predetermined ignition count N1 is set to a large value, variations in the number of occurrences of abnormal vibration detected while N1 ignitions are executed will be reduced and the detecting accuracy will improve, but the time that elapses before detecting of preignition will become long. Therefore, the predetermined ignition count N1 must be determined in accordance with the tradeoff between detecting accuracy and detecting time.

When the determination at step 27d is negative, that is, when the ignition count has reached the predetermined ignition count, processing from step 27e through step 27j is carried out.

At step 27e, an abnormal vibration accumulated value NKA which is a accumulated sum of the differences between the number of occurrences of abnormal vibration, detected while the predetermined times ignitions are executed, and a predetermined abnormal vibration occurrence count N2 is calculated.

$$NKA = NKA + (NKC - N2)$$

That is, as the number of occurrences of abnormal vibration detected, while the predetermined ignitions are executed, increases, the count value of the abnormal vibration occurrence counter NKC increases and the abnormal vibration cumulative value NKA also increases.

Note, the predetermined abnormal vibration occurrence count N2 is a threshold value for determining that abnormal vibration has been occurring frequently. Normally, this value should be determined by multiplying the predetermined ignition count by a target abnormal vibration occurrence frequency based on which control for suppressing abnormal vibration is to be performed. However, since the predetermined ignition count is set to a relatively small value, for example, 50, the actual value of the predetermined abnormal vibration occurrence count N2 is determined by first multiplying the predetermined ignition count by the target abnormal vibration occurrence frequency based on which control for suppressing abnormal vibration is to be performed, and then multiplying the resulting product by a safety coefficient α of 1.0 or larger. That is, the following equation is used.

N2=(Target abnormal vibration occurrence frequency×N1)×α

At steps 27f and 27g, when the abnormal vibration cumulative value NKA becomes negative, a lower limit of "0" is imposed on the accumulated value.

At step 27h, it is determined whether or not the abnormal vibration accumulated value NKA is less than a preignition occurrence value NP.

When the determination at 27h is negative, that is, when the abnormal vibration accumulated value NKA is not less than the preignition occurrence value NP, a preignition warning is issued and an operation for avoiding preignition is performed at step 27i before proceeding to step 27j. Conversely, when the determination at 27h is affirmative, that is, when the abnormal vibration cumulative value NKA is less than the preignition occurrence value NP, the control proceeds directly to step 27j.

At step 27j, the ignition count counter IGN and the abnormal vibration occurrence counter NKC are reset, and this subroutine is terminated.

Note, the abnormal vibration accumulated value NKA is not reset in step 27j, but this is to detect preignition as soon as possible when preignition frequently occurs.

In the second preignition detection process, it would be desirable to set the safety coefficient α as close to 1.0 as possible from the viewpoint of enhancing the detecting accuracy, but this would require that the predetermined ignition count N1 is set to a large value to accelerate the detection.

One way to bring the safety coefficient a close to 1.0 while maintaining the detection speed is by dividing the predetermined ignition count N1 by n, updating the number of occurrences of abnormal vibration every (N1/n) ignition count, and by making a decision on preignition based on the number of occurrences of abnormal vibration detected while the ignition count N1.

Further, in the second preignition detecting subroutine, attention is directed only to the number of occurrences of abnormal vibration. But when the level of abnormal vibration is large, it is also possible to take into account the level of the vibration by multiplying the number of occurrences by an appropriate factor, for example, 1.5.

FIG. 6A–6D are diagrams for explaining the operation in the second preignition detecting subroutine. The count value of the abnormal vibration occurrence counter, the count value of the abnormal vibration occurrence counter minus the value of the predetermined abnormal vibration occurrence count, the abnormal vibration accumulated value, and the ignition timing are shown in this order from the top to the bottom. Time is plotted along the abscissa.

The figure shows the case in which an increase in the number of occurrences of abnormal vibration is detected at times $t_1$, $t_2$, $t_3$, and $t_4$ to $t_7$, that is, the value (NKC–N2) becomes positive at the respective times.

At times $t_1$, $t_2$, and $t_3$, the abnormal vibration accumulated value increases, but thereafter the abnormal vibration accumulated value decreases, that is, the value (NKC–N2) becomes negative and, hence, the abnormal vibration accumulated value becomes "0".

However, between time $t_4$ and time $t_7$, the number of occurrences of abnormal vibration increases continuously, so that the abnormal vibration accumulated value gradually increases, exceeds the preignition occurrence value NP at time $t_5$, and it is decided that preignition has occurred.

From time $t_0$ to time $t_6$, the actual ignition of the air-fuel mixture occurs later than the ignition timing and it is determined that preignition does not occur, but after time $t_6$, the actual ignition occurs earlier than the ignition timing, and it is determined that preignition has occurred.

According to the second preignition detecting process, it is determined that preignition has occurred at time $t_5$ before time $t_6$, and preignition can be detected in an incipient stage.

Since a condition where preignition may occur is always accompanied by frequent occurrences of abnormal vibration, it is possible to certainly detect a condition where preignition may occur though an ignition timing is controlled so that it is delayed to suppress abnormal vibration.

In the above embodiment, the preignition determination value PJ and the preignition occurrence value NP are fixed over the entire operating range of the engine, but in that case, there may occur an erroneous decision or a delay in detection.

Figure 7:
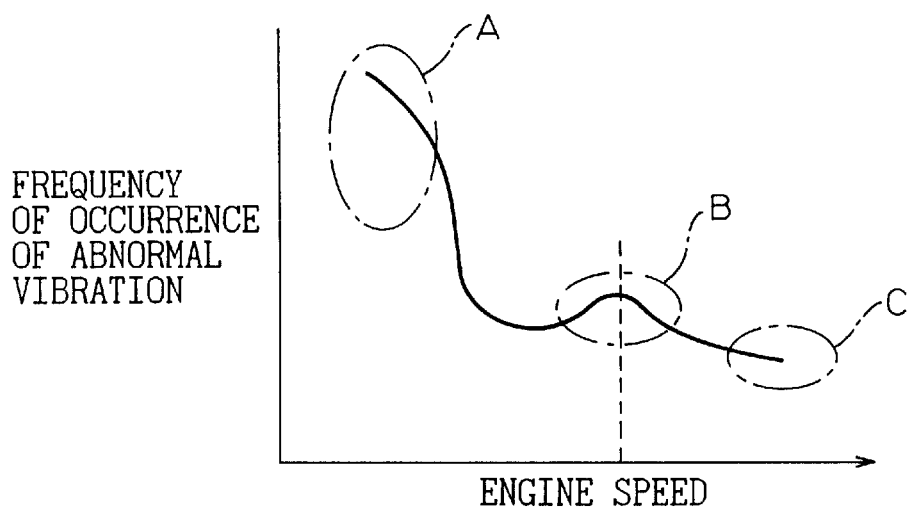
FIG. 7 is a diagram showing a relationship between the frequency of occurrence of abnormal vibration and engine speed.

FIG. 7 is a diagram showing a relationship between the frequency of occurrence of abnormal vibration and engine speed, and the engine speed is plotted along the abscissa and the frequency of occurrence of abnormal vibration along the ordinate. As shown, the frequency of occurrence of abnormal vibration varies greatly depending on the engine speed because, for example, the charging efficiency varies depending on the engine speed.

Accordingly, when the preignition determination value PJ and the preignition occurrence value NP are determined based upon the conditions of the low-speed range A, there occurs a delay in detecting preignition in the mid-speed range B or high-speed range C.

Conversely, when the preignition determination value PJ and the preignition occurrence value NP are determined based upon the conditions of the mid-revolution range B or high-revolution range C, it may be incorrectly determined that preignition occurs as soon as abnormal vibration has occurred.

One way to solve this problem is to map the preignition determination value PJ and preignition occurrence value NP according to the engine speed. Alternatively, preignition detection may be limited to the mid- and high-speed ranges, considering the fact that preignition is not likely to occur in the low-speed range.

The above-described process detects abnormal vibration collectively for all the cylinders of the engine with one sensor. It may be possible to improve detecting accuracy by detecting abnormal vibration at every cylinder because the amount of adhering deposits, which function as hotspots, depends upon the cylinder.

In some internal combustion engines, a cylinder internal pressure sensor or an ion sensor for detecting an ion current is provided for each cylinder to detect conditions that can induce preignition, but, providing such a sensor for each cylinder is disadvantageous from the viewpoint of economy and construction, and it is only possible to detect a hot spot near the sensor using the ion sensor.

According to the preignition detecting apparatus of the present invention, on the other hand, preignition can be detected quickly without specifically providing any additional sensor.

In a preignition detecting apparatus designed to detect preignition based on the timing of the occurrence of abnormal vibration, the timing to detect abnormal vibration must be controlled to avoid incorrect determination due to noise associated with the opening and closing of intake and exhaust valves, etc. This inevitably leads to increased complexity of the construction.

Though it is possible to determine that preignition has occurred when the amplitude of abnormal vibration (the frequency of occuring abnormal vibration) increases, not only the construction becomes more complex, but also detecting time becomes longer.

Conversely, the preignition detecting apparatus according to the present invention is not only simple in its construction, but it also detects preignition at an early stage.

There are several method of avoiding preignition, among them:

1. Set the ignition timing to the most retarded timing $T_D$.
2. Reduce the intake air flow rate.
3. Change the air-fuel ratio.
4. Cut-off the fuel.

While fuel cut-off is the most reliable method to avoid preignition, vehicle drivability is inevitably deteriorated.

According to the preignition detecting apparatus of the present invention, since conditions causing or likely to cause preignition can be evaluated based on the abnormal vibration accumulated value NKA, it is also possible to suppress preignition by changing the air-fuel ratio according to the abnormal vibration accumulated value NKA.

Figure 8:
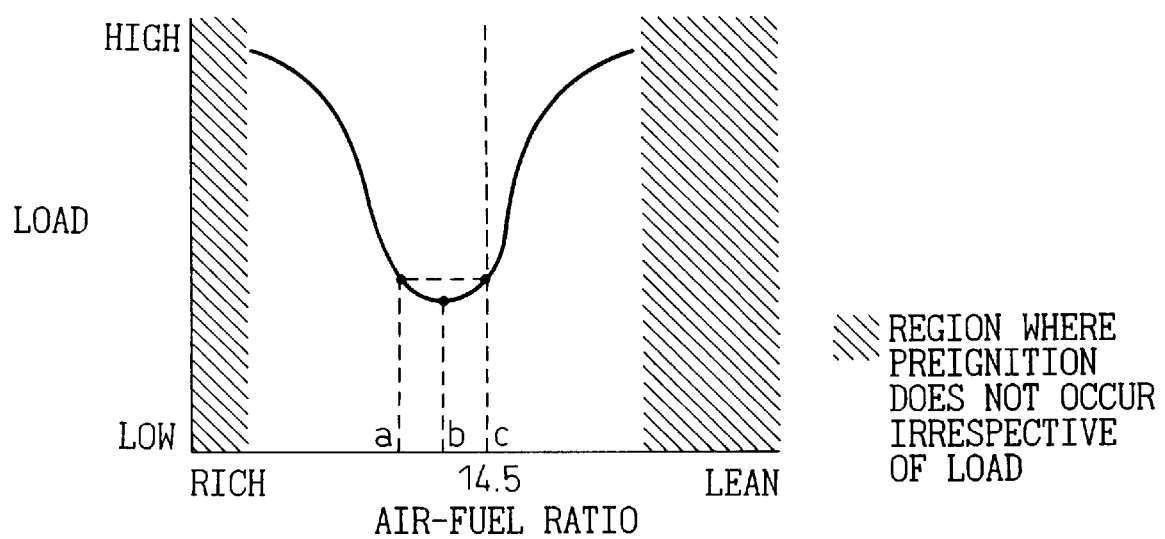
FIG. 8 is a diagram showing a relationship between the occurrence of preignition and an air/fuel ratio.

FIG. 8 is a diagram showing a relationship between the occurrence of preignition and air-fuel ratio, with load plotted along the ordinate and air/fuel ratio along the abscissa.

As can be seen from this figure, preignition easily occurs when the air-fuel ratio is set at b which is a point slightly deviated to the rich side from the stoichiometric air-fuel ratio (14.5).

Since the air-fuel ratio is normally controlled at the stoichiometric air-fuel ratio to facilitate purification of an exhaust gas, it is necessary to set an air-fuel ratio to more lean than "c", that is, the stoichiometric air-fuel ratio or to richer than "a" corresponding to the stoichiometric air-fuel ratio to suppress preignition.

In situations where the air-fuel ratio cannot be changed abruptly because of the need to maintain drivability, the air-fuel ratio should be set outside the range a to c.

In practice, it is desirable to set the air fuel ratio to an upper limit or lower limit value, a marginal region that can still achieve combustion, that is, the shaded regions (regions where preignition does not occur irrespective of the load) at both ends of FIG. 8.

We claim:

1. A preignition detecting apparatus comprising:
   a vibration detecting means for detecting vibration of an internal combustion engine;
   an abnormal vibration occurrence interval measuring means for measuring a time interval while abnormal vibration higher than a predetermined level is being detected by the vibration detecting means;
   a frequent vibration continuing interval measuring means for measuring a time interval while the abnormal vibration occurrence interval measured by the abnormal vibration occurrence interval measuring means is shorter than a predetermined non-abnormal vibration continuing interval; and
   a preignition determining means for determining that preignition has occurred when the frequent vibration continuing interval measured by the frequent vibration continuing interval measuring means becomes longer than a predetermined preignition determining interval.

2. A preignition detecting apparatus of claim 1, wherein the frequent vibration continuing interval measuring means uses a non-abnormal vibration continuing interval determined in accordance with a non-abnormal vibration interval while a non-abnormal vibration lower than the predetermined level is being detected by the vibration detecting means.

3. A preignition detecting apparatus of claim 1, wherein the frequent vibration continuing interval measuring means uses a non-abnormal vibration continuing interval which becomes longer as an engine speed becomes lower.

4. A preignition detecting apparatus of claim 1, wherein the preignition determining means uses a preignition determining interval determined in accordance with a frequent vibration continuing interval.

5. A preignition detecting apparatus comprising:
   a vibration detecting means for detecting vibration of an internal combustion engine;
   an abnormal vibration frequency calculating means for calculating a frequency of occurrence of abnormal vibration, wherein abnormal vibration is determined to occur when the vibration detected by the vibration detecting means is higher than a predetermined level;
   an accumulating means for accumulating the frequency calculated by the abnormal vibration frequency calculating means; and
   a preignition determining means for determining that preignition has occurred when the accumulated frequency becomes larger than a predetermined preignition determining value.

6. A preignition detecting apparatus of claim 5, wherein the preignition determining means uses a preignition determining value which becomes larger as an engine speed becomes lower.

7. A preignition detecting method comprising the steps of:
   a vibration detecting step for detecting vibration of an internal combustion engine;
   an abnormal vibration occurrence interval measuring step for measuring a time interval while abnormal vibration higher than a predetermined level is being detected at the vibration detecting step;
   a frequent vibration continuing interval measuring step for measuring a time interval while the abnormal vibration occurrence interval measured at the abnormal vibration occurrence interval measuring step is shorter than a predetermined non-abnormal vibration continuing interval; and
   a preignition determining step for determining that preignition has occurred when the frequent vibration continuing interval measured at the frequent vibration continuing interval measuring step becomes longer than a predetermined preignition determining interval.

8. A preignition detecting method of claim 7, wherein the frequent vibration continuing interval measuring step uses a non-abnormal vibration continuing interval determined in accordance with a non-abnormal vibration interval while a non-abnormal vibration lower than the predetermined level is being detected at the vibration detecting step.

9. A preignition detecting method of claim 7, wherein the frequent vibration continuing interval measuring step uses a non-abnormal vibration continuing interval which becomes longer as an engine speed becomes lower.

10. A preignition detecting method of claim 7, wherein the preignition determining step uses a preignition determining interval determined in accordance with a frequent vibration continuing interval.

11. A preignition detecting method comprising the steps of:
 a vibration detecting step for detecting vibration of an internal combustion engine;
 an abnormal vibration frequency calculating step for calculating a frequency of occurrence of abnormal vibration, wherein abnormal vibration is determined to occur when the vibration detected at the vibration detecting step is higher than a predetermined level;
 an accumulating step for accumulating the frequency calculated at the abnormal vibration frequency calculating step; and
 a preignition determining step for determining that preignition has occurred when the accumulated frequency becomes larger than a predetermined preignition determining value.

12. A preignition detecting method of claim 11, wherein the preignition determining step uses a preignition determining value which becomes larger as an engine speed becomes lower.

13. A preignition detecting apparatus of claim 1, wherein the frequent vibration continuing interval measuring means measures the frequent vibration continuing interval in which the abnormal vibration occurs repeatedly.

14. A preignition detecting apparatus of claim 1, wherein the frequent vibration continuing interval is measured within the predetermined non-abnormal vibration continuing interval.

15. A preignition detecting apparatus of claim 5, wherein the abnormal vibration frequency calculating means calculates a frequency of repeated occurrences of the abnormal vibration.

16. A preignition detecting apparatus of claim 5, wherein the abnormal vibration frequency calculating means calculates the frequency within a predetermined non-abnormal vibration continuing interval.

17. A preignition detecting method of claim 7, wherein the frequent vibration continuing interval includes a time interval in which the abnormal vibration occurs repeatedly.

18. A preignition detecting method of claim 7, wherein the frequent vibration continuing interval is measured within the predetermined non-abnormal vibration continuing interval.

19. A preignition detecting method of claim 11, wherein the abnormal vibration frequency calculating step includes a substep of calculating a frequency of repeated occurrences of the abnormal vibration.

20. A preignition detecting method of claim 11, wherein the frequency is calculated within a predetermined non-abnormal vibration continuing interval.

* * * * *